United States Patent [19]

Welch

[11] Patent Number: 4,562,631

[45] Date of Patent: Jan. 7, 1986

[54] ADJUSTING TOOL AND MEANS FOR ADJUSTING THE AXIAL POSITION OF A TRACTOR WHEEL AND HUB WITH RESPECT TO AN AXLE

[76] Inventor: William R. Welch, R.R. #2, Duncombe, Iowa 50532

[21] Appl. No.: 657,882

[22] Filed: Oct. 5, 1984

[51] Int. Cl.⁴ .............................................. B23P 19/04
[52] U.S. Cl. ....................................................... 29/259
[58] Field of Search ................ 29/256, 258, 259, 260, 29/261, 262, 264

[56] References Cited

U.S. PATENT DOCUMENTS

| | | |
|---|---|---|
| 2,230,918 | 2/1941 | Walter . |
| 2,497,148 | 2/1950 | Allen ...................................... 29/262 |
| 2,821,776 | 2/1958 | Keister . |
| 2,821,777 | 2/1958 | Keister . |
| 3,372,475 | 3/1968 | Selby . |
| 3,568,294 | 3/1971 | Conner . |
| 3,689,978 | 9/1972 | Kelso . |
| 3,696,496 | 10/1972 | Corder ................................... 29/260 |
| 3,908,258 | 9/1975 | Barty . |

FOREIGN PATENT DOCUMENTS 293582 7/1928 United Kingdom .................. 29/260

Primary Examiner—Robert C. Watson
Attorney, Agent, or Firm—Zarley, McKee, Thomte, Voorhess & Sease

[57] ABSTRACT

An adjustment tool and means for adjusting the axial position of a tractor wheel and hub with respect to an axle including a cross beam with two perpendicularly extending arms being adjustably positionable on the cross beam. The arms extend to abut against the wheel and have rod members extending from those ends which are insertable through auxiliary apertures in the wheel. A center rod is mounted on the cross beam, is adjustable perpendicularly to the longitudinal axis of the cross beam, and is alignable with the axle of the tractor. The hub and wheel can be moved outwardly along the tractor axle by securing the rods on the end of the arms to the wheel and then adjusting the center rod down against the tractor axle causing the secured rods and arms to pull the wheel and hub along the axle. The wheel and hub can be pushed inwardly along the axle by securing an axle gripping means to the inner end of the center rod and adjusting the center rod outwardly from the axle to cause the center bar to move inwardly and cause the arms to push the hub and wheel inwardly along the axle.

2 Claims, 7 Drawing Figures

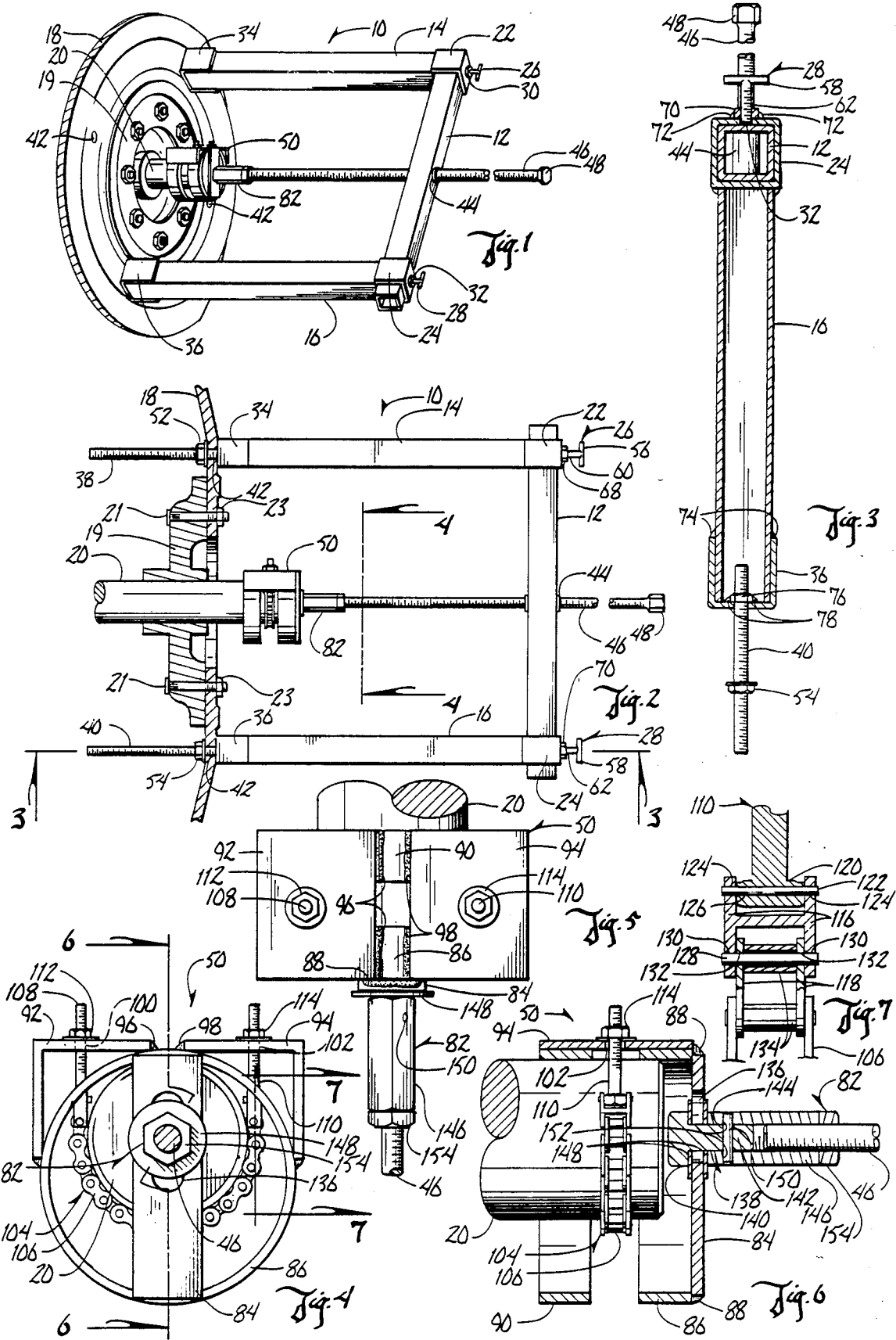

4,562,631

ADJUSTING TOOL AND MEANS FOR ADJUSTING THE AXIAL POSITION OF A TRACTOR WHEEL AND HUB WITH RESPECT TO AN AXLE

BACKGROUND OF THE INVENTION

1. Field of Invention

This invention relates to a tractor wheel and hub adjustment tool, and more particularly, to a tractor wheel and hub adjustment tool for adjusting the position of a tractor wheel and hub either inwardly or outwardly along the axle of a tractor and means for doing the same.

2. Problems in the Art

Large tractor wheels and hubs must, from time to time, be adjusted as to their position along the axle of a tractor. This adjustment is required for various reasons, among them, to vary the width of the drive wheels of the tractor to accommodate varying row crop spacings, to accommodate application of dual wheels for various uses, to provide increased stability for hilly terrain, etc. The size and weight of such wheels and hubs, and the rigidity with which the hub must be secured to the axle make adjustment of the wheels and hubs along the axle difficult.

Because of the tight tolerances and substantial weight of the wheels, movement along the axle requires equal pressure around the circumference of the hub and wheel so that binding does not occur.

It is therefore a principle object of the invention to provide an adjustment tool and means for adjusting the axial position of a tractor wheel and hub with respect to an axle which can adjust the position of a tractor wheel and hub along the axle of a tractor easily and efficiently.

Another object of the invention is to provide an adjustment tool and means for adjusting the axial position of a tractor wheel and hub with respect to an axle which can either push the wheel and hub inwardly or pull the wheel and hub outwardly along the tractor axle.

A further object of this invention is to provide an adjustment tool and means for adjusting the axial position of a tractor wheel and hub with respect to an axle which utilizes existing auxiliary apertures in the tractor wheel to accomplish adjustment of the wheel and hub along the axle.

Another object of this invention is to provide an adjustment tool and means for adjusting the axial position of a tractor wheel and hub with respect to an axle which is adjustable for various sized tractor wheels and hubs, and which is adjustable for various spacings of the auxiliary apertures in the tractor wheel.

A further object of this invention is to provide an adjustment tool and means for adjusting the axial position of a tractor wheel and hub with respect to an axle which utilizes the tractor axle as a stationary pressure point by which to either push or pull the tractor wheel and hub.

Another object of this invention is to provide an adjustment tool and means for adjusting the axial position of a tractor wheel and hub with respect to an axle which can adjust the wheel and hub inwardly or outwardly on various length and width tractor axles.

Another object of the invention is to provide a tractor wheel and hub adjustment tool which is simple in construction, durable, easily maintained and repairable, and economical.

A further object of this invention is to provide an adjustment tool and means for adjusting the axial position of a tractor wheel and hub with respect to an axle which provides equal pulling or pushing pressure around the circumference of the tractor hub and wheel.

These and other features, objects, and advantages of the invention will become apparent to those skilled in the art by reference to the accompanying specification.

SUMMARY OF THE INVENTION

This invention utilizes a framework consisting of a cross beam and two perpendicularly extending arms, with a center rod to provide either pulling or pushing force against the tractor axle to adjust the tractor wheel and hub to a desired position along the tractor axle. The center rod is mounted to the cross beam extending perpendicular to the longitudinal axis of the cross beam. The center rod is adjustable along its longitudinal axis with respect to the cross beam. The arms are adjustably positionable along the cross beam to accommodate various width wheels. The arms also have rod members extending from their outermost ends which are insertable into auxiliary apertures in the tractor wheel to secure the arms in place.

By securing the rod members to the wheel, by any conventional means, the center rod is positioned so that it is adjusted down upon the end of the tractor axle and thereby provides pressure to the cross beam, arms, and secured rod members to pull the tractor wheel and hub outwardly along the axle to a desired position.

By adding an axle gripping means to the end of the center rod, and by adjusting the center rod away from the axle, inward pressure is provided on the cross beam, arms and rod member to push the tractor wheel and hub inwardly along the axle. The wheel and hub may also be moved outwardly along the axle using this embodiment by adjusting the center rod towards the axle.

BRIEF DESCRIPTION OF THE DRAWINGS

FIG. 1 is a prespective view of the invention in operative position upon a tractor hub and wheel.

FIG. 2 is a plan view of the inventon as depicted in FIG. 1.

FIG. 3 is a sectional view taken along line 3—3 of FIG. 2.

FIG. 4 is a partial sectional view taken along line 4—4 of FIG. 2.

FIG. 5 is a partial plan view of the axle gripping means of the invention.

FIG. 6 is a partial sectional view taken along line 6—6 of FIG. 4.

FIG. 7 is a partial sectional view taken along line 7—7 of FIG. 4.

DETAILED DESCRIPTION OF THE PREFERRED EMBODIMENT

In reference to the drawings, and particularly FIG. 1, there is shown a tractor wheel and hub adjustment tool 10 in accordance with the invention. A cross beam 12 connects and supports two perpendicular extending arms 14 and 16 which extend to and abut against the tractor rim or wheel 18 on opposite radial sides of tractor axle 20. Tractor wheel 18 is rigidly secured to tractor hub 19 by lug bolts 21 and lug nuts 23.

Arms 14 and 16 are adjustably positionable along cross beam 12 by means of sleeve members 22 and 24 which are rigidly attached to arms 14 and 16 and which surround cross beam 12. Set screws 26 and 28 extend through bores 30 and 32 in sleeve members 22 and 24 and can be selectively tightened and untightened to secure and release arms 14 and 16 for selected securement and adjustable positioning along cross beam 12. The opposite ends of arms 14 and 16 have end caps 34 and 36 and rod members 38 and 40 extending therefrom. The exact structure of the end caps and rod members can be seen in FIG. 3. Rod members 38 and 40 are insertable into auxiliary apertures 42 which conventionally exist in tractor rims or wheels 18.

Cross beam 12 also contains a threaded sleeve 44 approximately at its midpoint. Threaded sleeve 44 extends through cross beam 12 generally perpendicular to the longitudinal axis of cross beam 12 and generally parallel to the longitudinal axes of arms 14 and 16 which are generally parallel to one another. A screw threaded center rod 46 is threadably adjustable through threaded sleeve 44 and is alignable with the longitudinal axis of tractor axle 20. The end of center rod 46 on the opposite side of cross beam 12 from tractor wheel 18 has a hexigonal shaped head 48 which is operatively mateable with conventional wrenches for turning. The inner end of center rod 46 can either directly abut the end of tractor axle 20 to provide pressure leverage for pulling tractor wheel 18 and hub 19 outwardly along axle 20, or can be attached to axle gripping means 50 wherein the tractor wheel 18 and hub 19 can either be pulled outwardly or be pushed inwardly along axle 20.

By referring to FIG. 2, the exact nature by which tractor wheel and hub adjustment tool 10 is operatively positioned upon tractor wheel 18, hub 19, and axle 20 is shown. It is to be understood that hub 19 is releasably secureable to axle 20 by means known and conventional in the art. Rod members 38 and 40 extend through auxiliary apertures 42 in tractor wheel 18. In the preferred embodiment, rod members 38 and 40 are threaded and by tightening down nut washers 52 and 54 upon rod members 38 and 40, respectively, tractor wheel and hub adjustment tool 10 is secured to tractor wheel 18. Arms 14 and 16 are positionable to align with auxiliary apertures 42 in tractor wheel 18 by virtue of their slidable adjustability along cross beam 12. To secure them in place on cross beam 12, set screws 26 and 28 are tightened.

Before tightening of set screws 26 and 28, cross beam 12 is positioned so that screw threaded center rod 46 is directly aligned along the longitudinal axis of tractor axle 20. In FIG. 2, axle gripping means 50 is shown positioned on axle 20 with center rod 46 operatively attached thereto.

FIG. 3 illustrates the exact construction of cross beam 12 and arms 14 and 16. In the preferred embodiment, cross beam 12 is constructed from 20 inch long, 2 inch in diameter square tubing, and arms 14 and 16 from 18 inch long, 2 inch square tubing. Sleeve members 22 and 24 are constructed from 2¼ inch long, 2½ inch square tubing.

Set screws 26 and 28 are constructed from 3 inch long, ⅜ inch rods forming the T-handles 56 and 58, with 1 inch long, ⅜ inch threaded bolts 60 and 62 perpendicularly welded thereto. Apertures 64 and 66 are drilled in sleeve members 22 and 24, and then ⅜ inch nuts 68 and 70 are welded surrounding aperture 64 and 66 by welds 72. Bolts 60 and 62 are threadedly insertable therethrough to act as set screws 26 and 28 for sleeve members 22 and 24 against cross beam 12.

End caps 34 and 36 are simply made from U-shaped bent metal 2½ inch wide welded over the arms 14 and 16 by welds 74. Rod members 38 and 40 can be constructed from 8 inch long, ½ inch in diameter threaded rods and are positioned in end caps 34 and 36 by insertion through apertures 42 and threadable engagement with ½ inch nuts 76 welded to the inside of end caps 34 and 36 by welds 78. ½ inch nut washers 52, 54 are threadably insertable upon the outer end of rod members 38 and 40 to secure arms 14 and 16 to tractor wheel 18.

Hex head 48 of center rod 46 is a ¾ inch nut which can be either integrally forged with center rod 46 or welded thereon.

By referring to FIGS. 4–7, the structure of the axle gripping means 50 can be seen in greater detail. The end of center rod 46 is connected to a freely rotatable connector assembly 82 which is freely rotatably connected to a support piece 84 which is diametrically mounted over one end of a first tubular member 86 by welds 88. A second tubular member 90 is secured coaxially with first tubular member 86 by two L-shaped attachment brackets 92 and 94 by welds 96 and 98, respectively.

The L-shaped attachment brackets 92 and 94 straddle both first and second tubular members 86 and 90 and their first surfaces are tangential to first and second tubular members 86 and 90. Attachment brackets 92 and 94 are oppositely positioned to one another on the upper hemisphere of tubular members 86 and 90, as shown in FIG. 4, and have apertures 100 and 102 in their coplaner adjacent surfaces.

Chain assembly 104, comprised of chain segment 106 and bolts 108 and 110, is threaded around axle 20, bolts 108 and 110 are inserted into apertures 100 and 102, respectively, and nut washers 112 and 114 are threaded down upon bolts 108 and 110. By tightening nut washers 112 and 114, axle 20 is brought into abutment with the interior of first and second tubular members 86 and 90 and chain segment 106 securely grips axle 20, preventing longitudinal movement of the axle gripping means 50 and tractor and hub wheel adjustment tool 10 along the axle or with respect to the tractor wheel 18 and hub 19.

FIG. 7 depicts the exact manner in which chain segment 106 is connected to bolts 108 and 110. Opposite side plates 116 cover the side edges of chain ends 118 and bolt head 120 of each end of chain assembly 104. A pin 122 is insertable through matching aperture 124 of side plates 116 and channel 126 of bolt head 120 to pivotally secure bolts 108 and 110 thereto. A pin 128 extends through matching apertures 130 in side plates 116, matching apertures 132 in chain ends 118 and tube 134 to hingably secure ends of chain segment 106 thereto. Pins 122 and 128 are secured to side plates 116 by any method known in the art, including welding, flatening of their ends, cotter keys, etc.

By referring to FIG. 6, the exact structure of connector assembly 82 can be seen. A slot 136 in support pieces 84 (see also FIG. 4) receives a bolt 138 having its head 140 inside first tubular member 86, and its shaft 142 extending outwardly therefrom. Shaft 142 has a channel 144 running perpendicular to its longitudinal axis. Bolt 138 is threadably attached to threaded sleeve 146, with washers 148 buffering bolt head 140 from the interior side of support piece 84, and buffering threaded sleeve 146 from the exterior side of support piece 84.

A pin 150 is inserted and secured by known methods through matching aperture 152 in sleeve 146 and through channel 144 of bolt shaft 142 to secure those pieces in position. Axle grasping means 50 is then connected to the end of center rod 46 by threading center rod 46 into the outermost end of threaded sleeve 146, as shown in FIG. 6. A locking nut 154 is then brought along center rod 46 into tightened engagement with threaded sleeve 146. Locking nut 154 thus locks center rod 46 to connector assembly 82. Slot 136 and washers 148 allow bolt 138 to rotate within slot 136. The locking action of lock nut 154 thus allows center rod 46 and connector assembly 42 to rotate upon rotation of center rod 46.

In operation, tractor wheel and hub adjustment tool 10 can be used in at least two different manners. First, adjustment tool 10 can be used without axle gripping means 50 if all that is desired or needed is to move tractor wheel 18 and hub 19 outwardly along axle 20. This is accomplished by aligning center rod 46 with the axis of tractor axle 20, slidably adjusting arms 14 and 16 along cross beam 12 so that rod members 38 and 40 are inserted into auxiliary apertures 42 in tractor wheel 18, and securing arms 14 and 16 in that position by tightening set screws 26 and 28 upon cross beam 12. Nut washers 52, 54 are then tightened upon rod members 38 and 40 to secure arms 14 and 16 and cross beam 12 to wheel 18. A wrench means is then attached to hexigonal head 48 of center rod 46, and center rod 46 is threadably adjusted to move towards axle 20. Once center rod 46 is abuttingly engaged with axle 20, the securement of arms 14 and 16 to tractor wheel 18 will cause equal pressure to be applied on both sides of tractor wheel 18 and hub 19 and will cause them to move outwardly along axle 20 to its desired position.

Removal of wheel and hub adjustment tool 10 is accomplished by removing nut washers 52, 54 and then removing rod members 38 and 40 from auxiliary apertures 42.

The second use of the invention 10 involves preliminary preparation basically the same as previously described. Additionally, the axle gripping means 50 is attached to center rod 46 as set forth in the description of the structure of connector assmebly 82 above. First and second tubular members 86 and 90 are inserted around the end of axle 20, and chain assembly 104 is tightened around the end of axle 20 to securely grip the same and prevent any longitudinal movement of axle gripping means 58 or center rod 46 with respect to axle 20. If nut washers 52, 54 are tightened down upon rod members 38 and 40 as previously described, this embodiment of invention 10 could also be used to move tractor wheel 18 and hub 19 outwardly upon axle 20. Moreover, with or without the use of nut washers 52, 54, this embodiment of invention 10, by turning center rod 46 in a direction so that it attempts to pull away from the end of axle 20, would cause cross beam 12 and arms 14 and 16 to move forward towards axle 20 and cause tractor hub 19 and wheel 18 to be moved inwardly along axle 20 to a desired position.

This embodiment of the invention 10 is removed by removing nut washers 52, 54, if used, and by loosening nut washers 112 and 114 from bolts 108 and 110 of chain assembly 104, and thus withdrawing the invention 10 from tractor wheel 18 and tractor axle 20.

The included preferred embodiment is given by way of example only, and not by way of limitation to the invention, which is solely described by the claims herein. Variations obvious to one skilled in the art will be included within the invention defined by the claims.

For example, cross beam 12 could be a cross support of any of various shapes and configurations and additional arms could be used. The additional arms might or might not be adjustable and they might or might not require rod members at their ends.

Additionally, center rod 46 could be adjustable by means of some method other than screw action, for instance hydraulic means, air-powered means, lever means, etc.

What is claimed is:

1. An adjustment tool for adjusting the axial position of a tractor wheel and hub with respect to an axle, said wheel and hub having a central opening surrounding said axle and being axially slidable along said axle, comprising:
   tool frame means having at least two spaced apart wheel grasping means adapted to extend through said side openings of said wheel for retentively engaging said wheel;
   a first member mounted to said tool frame means for movement into abutment with the end of said axle;
   means associated with said first member for exerting an axial force towards or away from said end of said axle when in abutment with said end of said axle; and
   axle grasping means on said first member for retentively engaging said axle so that exertion of a force towards or away from said end of said axle causes said wheel and hub to slide axially on said axle when said wheel grasping means is in retentive engagement with said wheel and said axle grasping means is in retentive engagement with said axle;
   said axle grasping means having a U-shaped member adapted to extend substantially around said axle for said retentive engagement thereof.

2. An adjustment tool for adjusting the axial position of a tractor wheel and hub with respect to an axle, said wheel and hub having a central opening surrounding said axle and being axially slidable along said axle, comprising:
   tool frame means having at least two spaced apart wheel engaging means for engaging said wheel on opposite sides of said central opening;
   a first member mounted to said tool frame means for movement into abutment with the end of said axle;
   means associated with said first member for exerting an axial force away from said end of said axle when in abutment with said end of said axle; and
   axle grasping means on said first member for retentively engaging said axle so that exertion of a force away from said end of said axle causes said wheel and hub to slide axially inwardly on said axle when said wheel engaging means is in engagement with said wheel and said axle grasping means is in retentive engagement with said axle;
   said axle grasping means having a U-shaped member, adapted to extend substantially around said axle for said retentive engagement thereof.

* * * * *